April 1, 1924.　　　　　J. W. SILVER　　　　　1,488,767
CAR WHEEL AND MOUNTING THEREFOR
Filed Sept. 5, 1922

Witness.
John B. Dade.

Inventor
James W. Silver.
by Wilkinson & Giusta
his Attorneys

Patented Apr. 1, 1924.

1,488,767

UNITED STATES PATENT OFFICE.

JAMES W. SILVER, OF OGDEN, UTAH.

CAR WHEEL AND MOUNTING THEREFOR.

Application filed September 5, 1922. Serial No. 586,226.

*To all whom it may concern:*

Be it known that I, JAMES W. SILVER, a citizen of the United States, and a resident of Ogden, in the county of Weber and State of Utah, have invented certain new and useful Improvements in Car Wheels and Mountings Therefor, of which the following is a specification.

This invention relates to improvements in car wheels and mountings therefor, and particularly embodies the car wheel structure itself and as combined in association with a novelly coacting retaining collar and interposed cooperating means.

While the invention has been perfected with more especial reference to mine car work, where there is much dust as well as other loosely scattered substances to be contended with, it is nevertheless to be understood at the outset that the invention is not necessarily restricted to use in this particular relation, as the improvements doubtless may also be very satisfactorily employed in other analogous relations. For the purposes of simplicity of illustration and brevity of description, however, I will only disclose the improvements with particular reference to mine car wheels and mountings therefor, but with the understanding that no restrictions are thereby imposed thereon as to any one exact sphere of usefulness.

The primary object of the invention has been to devise effective and economical means whereby the car wheel is so rotatably supported by a rigidly fixed axle as to provide antifriction bearings, for taking the radial load and axial thrust, while at the same time providing for a snugly closed dust-proof arrangement, for excluding dust, dirt and other foreign substances generally from the bearings and lubricating means.

The foregoing and other objects and advantages, however, will be so clearly apparent, as incidental to the following disclosure, that it would serve no useful purpose to further enlarge upon the same initially, and with these prefacing remarks, therefore, reference will now be immediately had to the accompanying drawings, forming a part of this application and disclosing a practical embodiment of the improvements, in which drawings—

Figure 1:
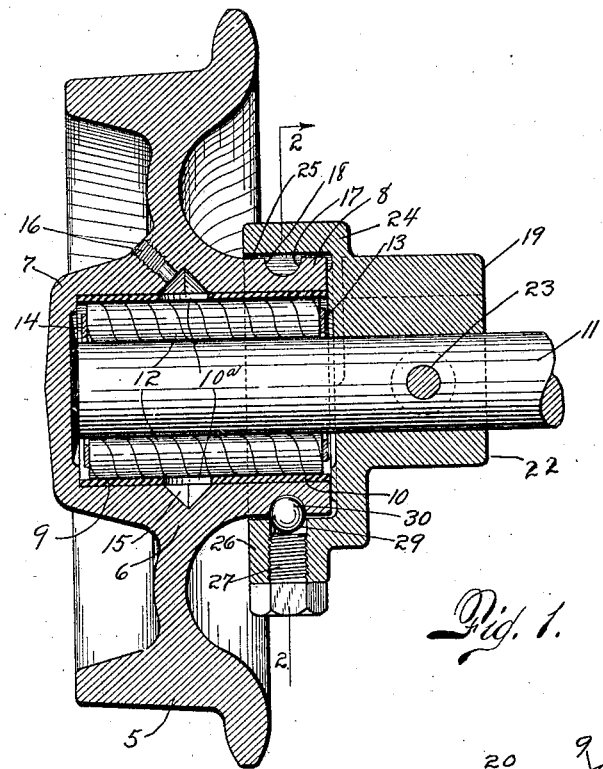
Figure 2:
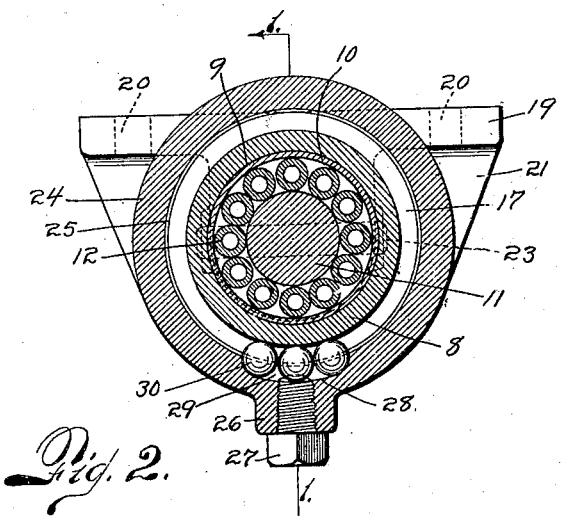

Figure 1 is a longitudinal sectional view of the improvements, as applied to an axle end, taken on the line 1—1 of Figure 2; and Figure 2 is a transverse sectional view thereof, taken on the line 2—2 of Figure 1.

The numeral 5 designates a car wheel, having an enlarged hub section 6 that provides an outwardly disposed closed extension 7 and an oppositely disposed elongated neck extension 8, which latter is preferably projected exteriorly beyond the zone of the wheel flange. The closed end wall of the extension 7 is preferably formed integrally with the extension, but it could be in the nature of a threaded cap if found desirable.

The hub section provides the enlarged axial chamber 9, in which is preferably disposed a wear-cylinder or lining 10, for housing the end of the axle 11 and the anti-friction bearings 12, shown as rollers longitudinally disposed between the retaining or spacing disks 13—14, but by the present construction, the hub section also provides a dust-proof annular lubricant channel 15, having an inlet 16 which is closed by a plug, or a grease cup if preferred, not illustrated on the drawings. The roller bearings 12, as shown, are of a well known type, but of course any other suitable type of antifriction bearings could be employed in their place. Also, if preferred, the axle end could be provided with a wear cylinder, not shown, analogous to the wear-lining 10, although these features are not strictly essential to the actual invention. Where the lining sleeve 10 is employed, however, the same should be provided with one or more apertures $10^a$ disposed in the plane of the annular channel 15, to permit free passage of the lubricating medium to the bearings 12.

The peripheral face of the neck extension 8 provides an annular recess or groove 17—18, which in its lowermost position functions as a ball raceway recess that forms a part of retaining ball bearing means, for taking the end thrust or axial load. For convenience of reference, one surface of this annular recess is indicated at 17 and the opposite surface at 18.

The retaining collar comprises a casting which provides a horizontal top web 19, having bolt holes 20 for the rigid attachment of the retaining collar to its car body or proper support therefor, a vertical web 21, an axially bored or apertured collar body 22, for encompassing the axle 11, which collar body is suitably apertured, in registration with a complementary aperture through the axle, for the insertion of a keying bolt or rivet 23, an enlarged inner head 24 in the nature of an annular flange that provides a chamber 25 for housing the projecting end of the neck extension 8, and a lower nipple or boss 26, for said annular flange, that is threaded to receive a cap screw 27.

The keying element 23 may preferably be a rivet, inserted when cold and then heated by a torch for more facilely peening over its projecting end, but obviously the collar may be made fast to the axle in any other suitable way. In fact I do not intend to limit myself to the exact form of the retaining collar casting in its entirety, excepting as to its really essential features, and it will further be understood that a stoppered lubricating inlet, not shown, could readily be provided to lead directly to the ball bearing means, although this would hardly be necessary because the balls, hereinafter referred to, would be maintained properly lubricated by way of the wheel hub chamber and its lubricating channel 15, all in dust proof relation as will be readily apparent from the drawings.

The inner peripheral face of the flange wall 24, for a limited distance at a position adjacent to the boss 26, is formed with a comparatively short ball receiving recess or pocket 28, of circumferential curvature and semicylindrical in cross-section, one curved side face of which is indicated at 29, and this arcuate ball pocket 28 is adapted for congruent registration with its complementary annular groove or ball raceway recess 17—18, being of a length only to contain a limited number of suitable steel balls 30, say approximately three in number as shown, although I do not wish to unnecessarily limit myself to the exact length of this recess 28.

While in the drawings, there is only shown one end of the axle, it is of course understood that the arrangement is to be duplicated at the other end also, and while it is believed that the economical manner of assembly will be quite apparent from the drawings, it may be briefly stated that after the retaining collar has been fixedly secured to the axle 11, and the roller bearings 12 and wheel 5 properly fitted over the end of the axle, it is then that the balls 30 are slipped into their spaces 28—29—17—18, and the cap screw 27 threaded home to seat its opposed ball 30, for maintaining the car wheel in position relatively to its axle and retaining collar, while at the same time providing the anti-friction means for taking up the axial load or end thrust, the latter being taken up in one direction by the surfaces 18 and 29 with the interposed balls 30, and in the other direction by the surface 17 of the extension neck recess and the surface of the arcuate ball pocket 28 opposite to the surface 29, with the interposed balls 30 therebetween. The end thrust in this direction is also transmitted from the axle 11 through the collar body 22 to the wheel 5 by reason of the engagement of the inner flat face of the chamber 25 with the end of the hub 8, as clearly indicated in Fig. 1. It is also understood that the radial load, on the other hand, is taken wholly by the roller bearings 12, and not by the balls 30.

It is to be finally noted and emphasized that the car wheel hub has no unprotected outside opening at all, while the open inner end of its neck extension 8 is completely capped or encased by the retaining collar body and its annular hollow head or flange wall 24, so that all dust, grit and foreign substances generally are efficiently excluded from all bearings and the lubricating means therefor, which is highly desirable in all cases, and more especially so with wheel mountings for mine cars which have to encounter much dust and gritty substances in their operations.

It is believed that the advantages of all of the foregoing features will be fully apparent, especially to those cognizant of the needs of the industry, but while I have thus disclosed certain preferred embodiments of the invention, it may later be found to be expedient or desirable to make some alterations in the structural form and arrangement of parts, without in any way departing from the real gist of the invention, and it is to be understood, therefore, that I do not wish to unnecessarily restrict myself to all of the details exactly as shown and described, excepting as they may come within the terms of the ensuing claims, or equivalent elements in combination, or when fairly interpreted in the light of the specification if requisite.

What I do claim, as new and patentable, is:—

1. In car wheel mountings, the combination of a nonrotatable axle, roller bearings encompassing the outer end thereof, a car wheel mounted by said roller bearings, a retaining collar fixedly mounted relatively to said axle, the under portion of said collar being provided with an arcuate ball pocket for receiving and holding a plurality of antifriction thrust balls against revolution, and ball bearings mounted in said pocket between said retaining collar and said car wheel, which ball bearings retain said car wheel against axial displacement as well as in antifriction axial thrust relation to said retaining collar.

2. In car wheel mountings, the combination of a nonrotatable axle, roller bearings encompassing the outer end thereof, a car wheel mounted by said roller bearings and having a hub inner neck extension providing a raceway recess disposed peripherally therearound, a retaining collar fixedly mounted relatively to said axle and having a head flange wall forming an annular chamber snugly encompassing said neck extension, the said flange wall providing a ball pocket, in complementary registration with said raceway recess, and also providing an aperture leading to said ball pocket for the insertion of bearing balls therein, a plurality of non-revolving bearing balls in said ball pocket, and a plug for said aperture the inner end of which provides a seat for one of said bearing balls.

3. A retaining collar for car wheel mountings of the character herein disclosed, which comprises a body portion having a head flange wall forming an annular chamber, the said flange wall providing a relatively short arcuate ball pocket along its lowermost inside face, and also providing an aperture leading to said arcuate ball pocket for the insertion of bearing balls therein.

4. In car wheel mountings, the combination of a nonrotatable axle, a car wheel encompassing the outer end thereof and embodying a hub section providing an enlarged axial bore, an outwardly disposed extension closed at its outer end, a neck extension at its inner end providing a raceway recess disposed peripherally therearound, and a lubricant reservoir chamber formed within the body of said hub section and in direct open communication with said bore, roller bearings encompassing said axle end and housed within said axial bore, a retaining collar fixedly mounted relatively to said axle and having a head flange wall snugly encasing said neck extension in dust-proof relation, the said flange wall providing a relatively short ball pocket along its lowermost inside face, in complementary registration with said raceway recess, and also providing an aperture therethrough for the insertion of bearing balls into said pocket and raceway recess, a plurality of bearing balls mounted against revolution in said pocket and raceway recess, and a suitable plug element for said aperture.

In testimony whereof, I affix my signature.

JAMES W. SILVER.